April 6, 1937.  C. E. BROOME  2,076,015
SPEED REDUCTION POWER UNIT
Filed April 26, 1935   2 Sheets-Sheet 1
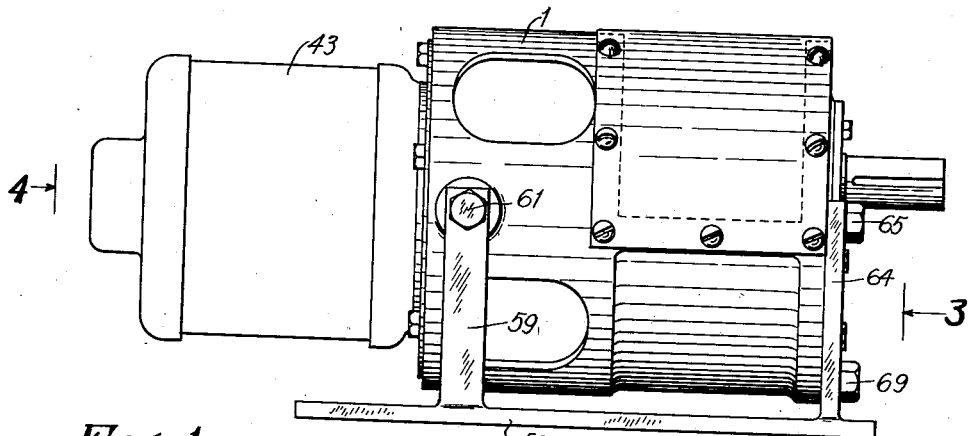
Fig. 1
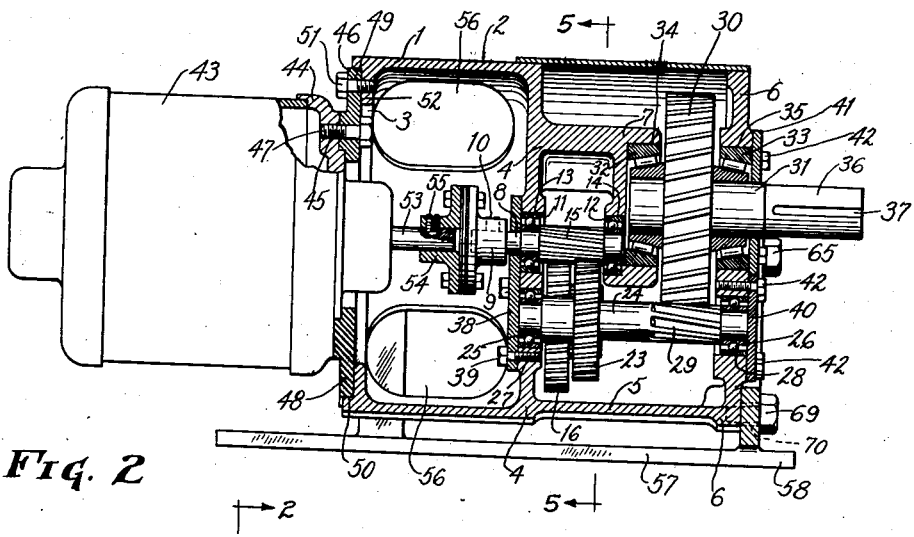
Fig. 2
Fig. 3
Fig. 7
INVENTOR.
Clifford E. Broome.
BY
ATTORNEY.

April 6, 1937.　　　　　C. E. BROOME　　　　　2,076,015
SPEED REDUCTION POWER UNIT
Filed April 26, 1935　　　　　2 Sheets-Sheet 2

INVENTOR.
Clifford E. Broome.
BY
ATTORNEY.

Patented Apr. 6, 1937

2,076,015

UNITED STATES PATENT OFFICE 2,076,015

SPEED REDUCTION POWER UNIT

Clifford E. Broome, Euclid, Ohio

Application April 26, 1935, Serial No. 18,408

4 Claims. (Cl. 74—421)

This invention relates to speed reduction power units by which power from a source at relatively high speed may be made available at relatively low speed.

Heretofore power units of this class have been provided comprising a frame upon which a motor such as an electric motor is mounted and speed reduction gears and a final shaft or other rotary element from which power and reduced speed may be taken. Such prior speed reducing units have, however, been of complicated construction rendering them expensive to produce and difficult to assemble. Furthermore, power supplying units of this class are generally provided with a final rotary driven shaft or like element from which power is taken, and being rotated at reduced speed, this final element is capable of developing very great torque; and in prior units of this class, the reaction of this torque upon the main supporting frame of the unit frequently has resulted in breakage of the frame itself or breakage of the feet, lugs, or other members of the frame by which it is secured to a floor or like support at the point of use.

It is therefore an object of this invention to provide generally an improved construction of speed reduction power unit.

Another object is to provide a speed reduction power unit having improved construction and arrangement of speed reducing gears and bearings therefor.

Another object is to provide a speed reduction power unit of the class referred to having improved supporting and enclosing housing construction for the power transmission and speed reducing parts thereof.

Another object is to provide, for speed reduction power units of the class referred to, improved means for securing the main frame of the unit to a floor or other support at the point of use.

Another object is to provide a speed reduction power unit of the class referred to having an improved separately constructed base upon which the unit as a whole may be mounted and having improved means for securing it to a floor or other support at the point of use.

Another object is to provide, in power units of the class referred to, an improved construction of frame whereby the reaction of the torque developed in the frame by the source of power may be transmitted to the floor or other support from the unit at the point of use in an improved manner.

Another object is to provide a power unit of the class referred to which will be more durable in use, and of reduced cost to manufacture and assemble as compared with prior units of this class.

Other objects will be apparent to those skilled in the art to which my invention appertains.

My invention will be fully disclosed in the following description taken in connection with the accompanying drawings, in which:

Fig. 1 is a side elevational view of a speed reduction power unit embodying my invention;

Fig. 2 is a view similar to Fig. 1 showing parts thereof in longitudinal section;

Fig. 3 is a front elevational view of the embodiment of Fig. 1, the view being taken in the direction of the arrow 3 of that figure;

Figure 4:
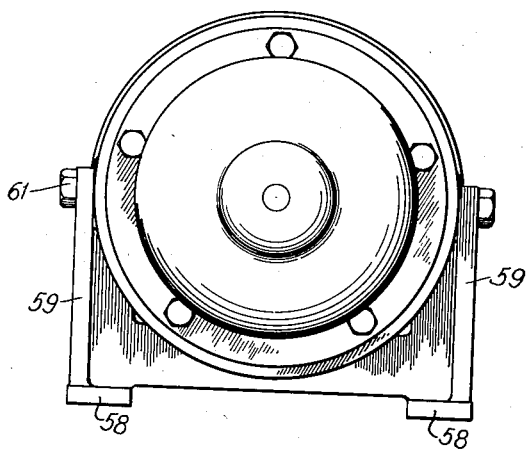
Fig. 4 is a rear elevational view of the embodiment of Fig. 1, the view being taken in the direction of the arrow 4 of Fig. 1.
Figure 5:
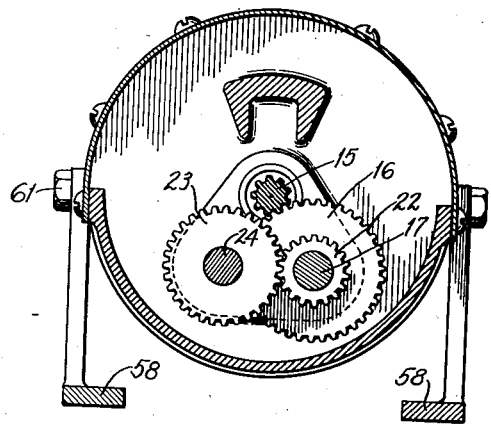
Fig. 5 is a cross-sectional view taken from the plane 5—5 of Fig. 1.
Figure 6:
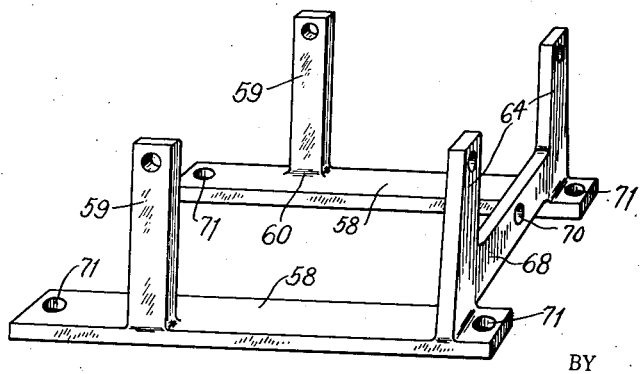
Fig. 6 is a separate view in perspective illustrating a cradle type base which I may employ and illustrated in the other figures.

Referring to the drawings, I have shown at 1 a housing preferably formed from cast metal, the rearward portion 2 of which is generally of hollow cylindrical form having a large opening therein as at 3 at its rearward end and in its forward portion having a transverse partition 4. In the lower forward part of the housing is a lower wall portion 5 extending forwardly from the partition 4 and having at its forward end a vertical wall 6. A bracket 7 extends forwardly from the partition 4 toward the wall 6. The parts thus far described may all be integrally formed in a single casting.

A shaft 8 having thereon one element 9 of a flexible coupling securing to the shaft 8 in any suitable manner, for example by a screw 10, is rotatably supported upon a pair of spaced ball bearings 11 and 12, the outer raceways of which are respectively fitted in bores 13 and 14 respectively in the partition 4 and bracket 7. A pinion 15 on the shaft 8 is disposed between the two bearings. The pinion 15 has its teeth meshed with the teeth of a gear 16 on a shaft 17 rotatably supported at opposite ends upon ball bearings seated in bores in the partition 4 and front wall 6 respectively.

The shaft 17 has mounted thereon a pinion 22 which meshes with a gear 23 on a shaft 24, which shaft is supported at opposite ends in ball bearings 25 and 26 seated in bores 27 and 28, formed respectively in the partition 4 and front wall 6. The above-mentioned bearings and bores for the shaft 17, which in the drawings are disposed behind the shaft 24, may be identical with the bearings 25 and 26, and bores 27 and 28 for the shaft 24.

On the shaft 24 is a pinion 29 meshing with a gear 30 on a shaft 31 supported upon roller bearings 32 and 33 fitted respectively in bores 34 and 35 formed in the bracket 7 and front wall 6 respectively; and the shaft 31 has an extension 36 provided with a keyway 37 upon which a pulley gear or other element may be mounted to deliver power, the shaft 31 being the final or power supplying element.

By the construction just described, the shaft 8 when rotated by a motor to be referred to at high speed, will rotate the shaft 31 at low speed and with a corresponding increase of torque.

It will be observed that each gear or pinion bearing shaft is supported at its end, i. e. on each side of the gear or pinion, and that there are no overhanging gears or pinions in the entire transmission.

By disposing the bearings above described in the arrangement given, the bored seats therefor may all be machined conveniently notwithstanding that the entire frame is in one casting. To this end, the bores 13 and 14 may be bored coaxially, the boring tool being accessible thereto through the large opening 3 in the rearward end of the housing; and the bores 20 and 21 being accessible, one through the said opening 3 and the other from the exterior of the housing at its forward end, the bores 27 and 28 being similarly accessible; and the bores 34 and 35 both being accessible from the forward end of the housing.

The bearings 12 and 32 may be seated in their bores which, as illustrated, have bottoms upon which the outer raceways may thrust. The outer raceways of the bearings 11, 18 and 25 may have end thrust upon a plate 38 secured to the partition 4 by bolts 39—39; and the outer raceways of the bearings 21, 26 and 33 may have end thrust on plates 40 and 41 secured on the outer face of the end wall 6 by bolts 42—42. The inner raceways may in each case abut upon the adjacent gear or an adjacent shoulder on the shaft, as the case may be.

In assembling the gears, shafts and bearings, the bearing 32 may be first placed in its seat, then the gear 30 supported generally in its final position and the shaft 31 projected through the gear and into the bearing 32, either with the bearing 33 thereon or the bearing may later be put on the shaft in the seat. The bearing 12 may first be put in its seat and the forward end of the shaft 8 projected thereinto and the bearing 11 may then be put in its seat on the shaft.

In the case of the shafts 17 and 22, the bearings 19 and 26 thereof may first be placed in their seats, and the gears 20 and 23 suspended approximately in final position, and the shafts 17 and 24 projected through the shaft and into the said seated bearings; then the bearings 18 and 25 may be put in their seats on the shafts. To this end, it is preferred that the pinion 29 engaging the gear 30 be cut in the shaft 24.

Thus all of the gears and pinions may be supported without any of them overhanging a bearing notwithstanding that the housing is all in one piece.

A power supply electric motor is shown generally at 43. The end bell 44 of the motor housing is provided with a plurality of threaded holes 45 by which it is secured to a ring 46 by bolts 47 projected through the ring and threaded into the holes 45. The ring has a peripheral flange 48, preferably annular in shape, and threaded at spaced points therearound as at 49 and at its periphery is seated in a groove 50 adjacent the end opening 3 of the housing, and is secured in the groove to support the motor on the housing by a plurality of bolts 51 projected through suitable holes in a corresponding plurality of feet 52 projecting inwardly from the wall of the housing and screwed into the threaded holes 49.

The motor shaft 53 extends into the housing portion 2 and has the other element 54 of the flexible coupling referred to secured on the shaft end in any suitable manner as for example by a screw 55.

By the construction just described, the motor is centered with its shaft coaxial with the shaft 8 by the engagement and fit of the flange 48 and screw 50, and is rigidly secured to the housing 1 and supported thereby.

The housing portion 2 is preferably provided with a plurality of openings 56—56 through which access may be had to the coupling to disconnect it from the shafts to permit removal of the motor or mounting of it on the housing as the case may be, whereby the motor is rendered interchangeable with other motors in accordance with the horse power desired.

At 57 is indicated generally a base or cradle secured to the housing 1 to support it and adapted to be itself secured to the floor or other support upon which the unit is mounted at the point of use. The base is preferably constructed of wrought iron or rolled section to render it tough and non-breakable, and as presently will appear is secured to the housing 1 in such manner that the torque communicated to the housing 1 from the shaft 39 when load power is delivered thereby is transmitted to the base and thence to the support to which the base is secured without undue strains upon the housing 1 whereby the housing may be made from relatively brittle cast metal of relatively thin section.

While the base 1 which will now be described may be made in any suitable manner, I prefer to form it from pieces of wrought or rolled bar of rectangular section, welded together. When constructed in this manner, the base comprises a pair of spaced rails 58—58 of unequal rectangular cross-section and disposed with their lower flat sides in a horizontal plane. A pair of uprights 59—59 stand upon the rails 58—58 and are welded thereto as shown at 60. Adjacent the upper ends of the uprights 59, they are bolted to the housing 1 by bolts 61—61 projected through perforations 62—62 in the uprights and threaded into threaded bosses 63—63 cast integral with the housing 1 (see Fig. 3).

The uprights 59 are preferably adjacent the rearward ends of the rails 58 and adjacent the forward ends is a pair of uprights 64—64 welded at their lower ends to the rail 58 and extending upwardly along the forward face of the forward end wall 6 of the housing 1 and bolted thereto by bolts 65—65 projected through perforations 66—66 in the uprights 64—64 and screwed into threaded holes in the end wall 6, formed in bosses 67 cast integral with the end wall 6, as shown in Fig. 7.

The uprights 64—64 may be rigidly connected by a transverse tie element 68 welded at opposite ends to the uprights 64, and a bolt or bolts 69 may be projected through a perforation 70 therein and threaded into a boss on the end wall 6.

The rails 58—58 may be provided with a plurality of perforations 71 by which they may be bolted to the floor or other support upon which the unit is to be mounted, and the rails may extend forwardly and rearwardly beyond the uprights 64 and 59, respectively.

In the construction hereinbefore illustrated and described, bearings of the roller type are used only on the shaft 31 but it will be understood that roller type bearings may be employed instead of the ball bearings illustrated at the other bearings, when the size of the unit and the power transmitted through the other bearings is sufficiently large to warrant that type of bearing; and that inasmuch as the ball bearings illustrated are of the type which may be axially pressed or slid into a cylindrical bore, such bores without modification may be used for the roller type bearings, and said roller type bearings retained in the bores by the same means retaining the ball bearings therein as above described.

My invention is not limited to the exact details of construction shown and described. Many changes and modifications may be made without departing from the spirit of my invention or sacrificing its advantages and within the scope of the appended claims.

I claim:

1. In a speed reduction power unit, a main frame comprising a transverse end wall, a transverse intermediate wall, and a bracket between the end and intermediate walls supported on the intermediate wall, the said walls and bracket being rigidly integral in one piece and formed from cast metal, a lateral outwardly open aperture between the end wall and bracket formed to receive a main gear when projected laterally inwardly thereinto to position it between the end wall and bracket, aligned bearing apertures in the bracket and end wall, a bearing in the bracket aperture, a power supplying shaft projected through the end wall bearing aperture and through the main gear when in said position and into the bearing in the bracket aperture, a bearing in the end wall aperture telescoped over the power supplying shaft, a counter-shaft having a pinion thereon meshed with the main gear, aligned bearing apertures in the end and intermediate walls into which the opposite ends of the counter-shaft project, counter-shaft bearings in the apertures and on the counter-shaft end and supporting the counter-shaft, a gear on the counter-shaft, a motor supported on the main frame and operatively connected to the counter-shaft gear to drive it.

2. In a speed reduction power unit, a main frame comprising a transverse end wall, a transverse intermediate wall, and a bracket between the end and intermediate walls supported on the intermediate wall, the said walls and bracket being rigidly integral in one piece and formed from cast metal, a lateral outwardly open aperture between the end wall and bracket formed to receive a main gear when projected laterally inwardly thereinto to position it between the end wall and bracket, aligned bearing apertures in the bracket and end wall, a bearing in the bracket aperture, a power supplying shaft projected through the end wall bearing aperture and through the main gear when in said position and into the bearing in the bracket aperture, a bearing in the end wall aperture telescoped over the power supplying shaft, a counter-shaft having a pinion thereon meshed with the main gear, aligned bearing apertures in the end and intermediate walls into which the opposite ends of the counter-shaft project, counter-shaft bearings in the apertures and on the counter-shaft end and supporting the counter-shaft, a gear on the counter-shaft, a drive shaft, aligned bearing apertures in the bracket and intermediate wall into which the opposite ends of the drive shaft project, drive shaft bearings in the bracket and intermediate wall apertures on the ends of the drive shaft and supporting it, a pinion on the drive shaft, a motor on the main frame connected to the drive shaft to drive it, and connections between the pinion and the said counter-shaft gear to drive it therefrom.

3. In a speed reduction power unit, a main frame comprising a transverse end wall, a transverse intermediate wall, and a bracket between the end and intermediate walls supported on the intermediate wall, the said walls and bracket being rigidly integral in one piece and formed from cast metal, a lateral outwardly open aperture between the end wall and bracket formed to receive a main gear when projected laterally inwardly thereinto to position it between the end wall and bracket, aligned bearing apertures in the bracket and end wall, a bearing in the bracket aperture, a power supplying shaft projected through the end wall bearing aperture and through the main gear when in said position and into the bearing in the bracket aperture, a bearing in the end wall aperture telescoped over the power supplying shaft, a counter-shaft having a pinion thereon meshed with the main gear, aligned bearing apertures in the end and intermediate walls into which the opposite ends of the counter-shaft project, counter-shaft bearings in the apertures and on the counter-shaft end and supporting the counter-shaft, a gear on the counter-shaft, a drive shaft, aligned bearing apertures in the bracket and intermediate wall into which the opposite ends of the drive shaft project, drive shaft bearings in the bracket and intermediate wall apertures on the ends of the drive shaft and supporting it, a pinion on the drive shaft, a substantially tubular extension on the main frame having an annular seat therein, a motor having an annular frame element on the annular seat and bolted thereto, the motor having a shaft coaxial with the said drive shaft, a coupling connecting the motor shaft and drive shaft, and the tubular extension having an aperture therein giving access to the coupling.

4. In a speed reduction power unit, a main frame comprising a transverse end wall, a transverse intermediate wall, and a bracket between the end and intermediate walls supported on the intermediate wall, the said walls and bracket being rigidly integral in one piece and formed from cast metal, a lateral outwardly open aperture between the end wall and bracket formed to receive a main gear when projected laterally inwardly thereinto to position it between the end wall and bracket, aligned bearing apertures in the bracket and end wall, a bearing in the bracket aperture, a power supplying shaft projected through the end wall bearing aperture and through the main gear when in said position and into the bearing in the bracket aperture, a bearing in the end wall aperture telescoped over the power supplying shaft, a counter-shaft having a pinion thereon meshed with the main gear, aligned bearing apertures in the end and intermediate walls into which the opposite ends of the counter-shaft project, counter-shaft bearings in the apertures and on the counter-shaft end and supporting the counter-shaft, a gear on the counter-shaft, a drive shaft, aligned bearing apertures in the bracket and intermediate wall into which the opposite ends of the drive shaft project, drive shaft bearings in the bracket and intermediate wall apertures on the ends of the drive shaft and supporting it, a pinion on the drive shaft, a substantially tubular extension on the main frame, a motor secured to the tubular extension and having a motor shaft coaxial with the drive shaft, a coupling connecting the motor shaft and drive shaft, the tubular extension having an aperture therein giving access to the coupling.

CLIFFORD E. BROOME.